US012641088B1

(12) United States Patent
Subramanian et al.

(10) Patent No.: US 12,641,088 B1
(45) Date of Patent: May 26, 2026

(54) ACCESS AUDIT FRAMEWORK

(71) Applicant: Morgan Stanley Services Group Inc., New York, NY (US)

(72) Inventors: Palaniappan Subramanian, Bangalore (IN); Varun Anand, Bangalore (IN); Sriramkumar Ramasubbu, Tuticorin (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/372,892

(22) Filed: Oct. 29, 2025

(51) Int. Cl.
      *H04L 9/40*        (2022.01)
      *H04L 9/08*        (2006.01)
(52) U.S. Cl.
      CPC .......... H04L 63/105 (2013.01); H04L 9/0894 (2013.01)
(58) Field of Classification Search
      CPC ........................... H04L 63/105; H04L 9/0894
      See application file for complete search history.

(56)              References Cited

U.S. PATENT DOCUMENTS

| | | | |
|---|---|---|---|
| 11,783,062 B2 | 10/2023 | Lounsberry | |
| 2012/0072985 A1* | 3/2012 | Davne ..................... | H04L 67/10 |
| | | | 709/225 |
| 2013/0191629 A1* | 7/2013 | Treinen ................. | H04L 9/0833 |
| | | | 713/153 |
| 2013/0219176 A1* | 8/2013 | Akella .................. | G06F 16/185 |
| | | | 713/165 |

| | | | |
|---|---|---|---|
| 2014/0180950 A1* | 6/2014 | Sinclair ................ | G06Q 50/265 |
| | | | 705/325 |
| 2014/0289516 A1* | 9/2014 | Sahay ................... | G06F 21/121 |
| | | | 713/173 |
| 2016/0072771 A1* | 3/2016 | Krietzman ......... | G06Q 30/0277 |
| | | | 726/3 |
| 2020/0065464 A1 | 2/2020 | Dharmarajan | |
| 2022/0210194 A1 | 6/2022 | Parekh et al. | |
| 2024/0205226 A1 | 6/2024 | Lukyanov et al. | |
| 2025/0106259 A1* | 3/2025 | Hill ....................... | H04L 63/104 |

OTHER PUBLICATIONS

Xue et al., "An Attribute-Based Controlled Collaborative Access Control Scheme for Public Cloud Storage", Apr. 2019, IEEE Transactions on Information Forensics and Security, vol. 14, No. 11, pp. 2927-2942 (Year: 2019).*

* cited by examiner

*Primary Examiner* — Kenneth W Chang
(74) *Attorney, Agent, or Firm* — Leason Ellis LLP

(57)              ABSTRACT

Key vault access security migration is provided, including a computing device receiving key vault information. The key vault information is received from at least one entity operating a user computing device via an initialized release pipeline. Further, at least some of the key vault information is processed to determine a first access security model, including permissions to a cryptographic object for access to a respective technical resource. Data discovery determines cryptographic object permission and the computing device determines a role assignment that includes a security principal, at least one of a plurality of permissions, and the respective technical resource. Further, the computing device migrates access to the key vault for the entity from the first access security model to the second access security model. Access to the key is enabled as a function of the second access security model.

20 Claims, 9 Drawing Sheets

300

102

301

DATA DISCOVERY

302

CATALOG

304 ROLE ASSIGNMENT DATA

306 ROLE DEFINITION DATA

308 AKV VAP DATA

310 CRYPTO OBJECT PERMISSION

312 SUBSCRIPTION DATA

314

318

316

MAPPED ROLES WITH ACCESS POLICY

AKV RBAC ROLES

CATALOG

320 SANITIZING AKV DATA

322 FIND MISSING ROLES

324 MAPPING ROLES

326 UNDER/OVER PROVISIONING

328 EVALUATE SAFE TO MIGRATE

330

332 REPORTING

334 API SERVICE

336 AUDIT FEED

ACCESS AUDIT FRAMEWORK

FIELD

The present disclosure relates, generally, to information technology security and, more specifically, to a framework for migrating key vault access security.

BACKGROUND

Information technology security infrastructures in the enterprise can include services, known as vaults, which store and provide access to cryptographic keys and other security objects (e.g., certificates and passwords). One such prominent key vault security infrastructure ("infra") is provided by MICROSOFT AZURE, and referred to herein as the Azure Key Vault. Authorized users of computing devices can gain access to secured hardware and software systems, including private information and information sources, as a function of cryptographic objects stored in a key vault. Unfortunately, a lack of tracing user activity and user security compliance, with regard to key vault access in a respective security infrastructure, can be at least partially attributed to a lack of auditing. Such lack of auditing can regard what, when, how, and why cryptographic objects were accessed and used.

Organizations that adopt cloud-related services (e.g., provided by AZURE) for scalability, reliability, performance, and resilience/availability can become highly dependent on such services to store and manage cryptographic objects. The Azure Key Vault access policy ("VAP") determines whether a user, application or user group, can perform various operations in connection with key vault secrets, keys, and certificates. In response, administrators assign service access policies, for example in AZURE, using VAP.

Management of an Azure Key Vault has improved with the advent of Role-Based Access Control ("RBAC"), which is a permission-based model that can be used in place of VAP for managing Azure Key Vault. In operation, RBAC restricts permission management, such as only for an owner or respective administrator of a service. Access to resources is provided via RBAC as a function of role assignments having three elements: a security principal, a role definition (predefined set of permissions), and a scope (group of resources or individual resources).

Unfortunately, major challenges are faced in the enterprise when migrating the Azure Key Vault access model from VAP to RBAC, including due to VAP configured computing devices trying to access RBAC mode services connected to the Azure Key Vault. The computing devices seeking access to client resources, such as applications and databases, require a RBAC role using cryptographic objects from an Azure Key Vault. The RBAC role includes respective VAP-based access permission for a computing device to access a resource. Unfortunately, mapping an organization's users and users' activities with the Azure Key Vault remains difficult and incomplete.

It is with respect to these and other concerns that the present disclosure is presented.

BRIEF SUMMARY

In one or more implementations of the present disclosure, a computer-implemented system and/or method are provided for key vault access security migration. At least one computing device configured by executing instructions stored on processor readable media receives key vault information representing at least a key vault that includes a cryptographic object for access to digital resources. The key vault information is received from at least one entity operating a user computing device via an initialized release pipeline. Further, the at least one computing device processes at least some of the received key vault information to determine a first access security model, wherein the first access security model includes permissions to the cryptographic object for access to a respective technical resource. Still further, at least one computing device performs data discovery to determine at least cryptographic object permission and permission to the technical resource accessible as a function of the cryptographic object permission. The at least one computing device determines, as a function of the data discovery, a role assignment that includes a security principal, at least one of a plurality of permissions, and the respective technical resource associated with a second access security model. The determined role assignments correspond with at least some of the received key vault information. Further, the at least one computing device migrates access to the key vault for the entity from the first access security model to the second access security model. Access to the key can be enabled as a function of the second access security model.

In one or more implementations of the present disclosure, the role assignment further includes: role definition information; cryptographic object permission information; and subscription information; and further wherein the role assignment definition information can be determined as a function of information associated with the first access security model representing keys, secrets, certificates, and storage accounts.

In one or more implementations of the present disclosure, the role definition information represents: a principal who is assigned a respective role; the respective role assigned to the principal; and the technical resource.

In one or more implementations of the present disclosure, the cryptographic object permission includes access policies permission user accounts, groups, or applications to cryptographic objects in the key vault.

In one or more implementations of the present disclosure, the subscription information includes permission to keys, secrets, and certificates.

In one or more implementations of the present disclosure, determining the role assignment includes mapping, by at least one computing device, at least one role associated with the second access security model with at least some of the received key vault information.

In one or more implementations of the present disclosure, the steps of processing at least some of the received key vault information, performing data discovery, determining the role assignment, and migrating access to the key vault are performed substantially automatically, in accordance with at least one framework.

In one or more implementations of the present disclosure, the first access security model is vault access policy ("VAP") and the second access security model is role based access control ("RBAC").

In one or more implementations of the present disclosure, at least one computing device provides an audit associated with the entity's access to the key vault.

In one or more implementations of the present disclosure, at least one computing device implements a segregation of duty function for users, user groups, and objects as a function of the key vault access security migration.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1:
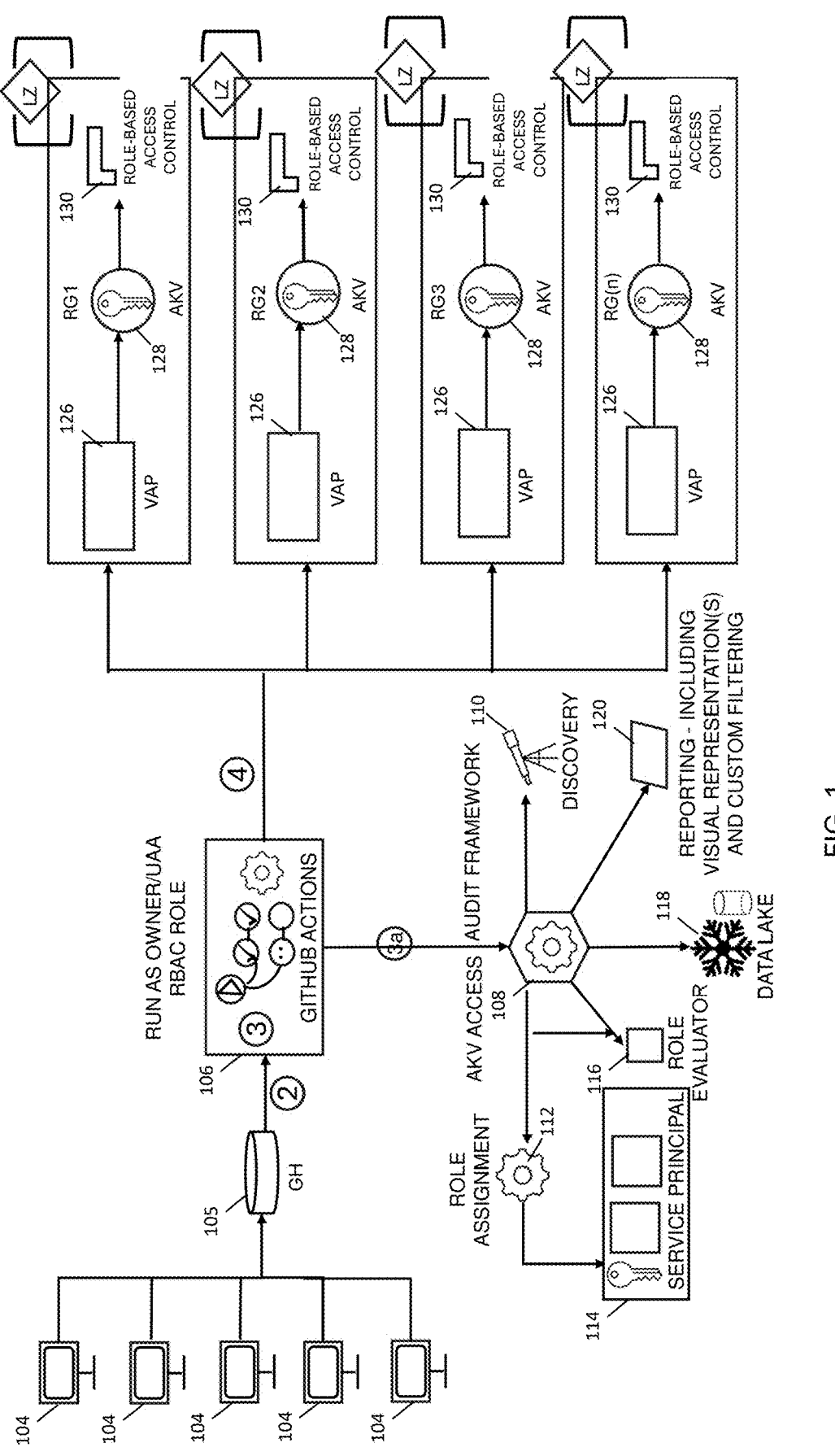
FIG. 1 illustrates computing devices, processes, resources, and interaction therebetween in connection with a key vault migration, in an example implementation of the present disclosure.

By way of introduction, the present disclosure provides methods and systems for improving security management and access to information technology infrastructure systems. Features are provided in the present disclosure for improved migration of access control models, including in terms of accuracy, efficiency, and security. In one or more implementations of the present disclosure, such migration is from a key vault access policy ("VAP") to Role-Based Access Control ("RBAC"), a control policy including a centrally managed self-service framework. Such models are associated with Azure Key Vault. The migration is a departure from one model, which supports locally managed permissions, to a model that is centrally managed. In addition to simplifying governance and providing auditing services, RBAC provides for fine-grained access control and privilege identity management ("PIM"). The present disclosure includes computing devices configured to evaluate RBAC roles as a function of Vault Access Policy, for each of a plurality of respective AKVs across AZURE estate.

One or more computing devices can be configured by executing instructions, such as instructions stored on processor-readable media (e.g., non-transitory processor-readable media) for end-to-end auditing and using the audit results to determine and assign appropriate RBAC roles that correspond to VAP.

Operations can be performed by one or more computing devices for VAP permission evaluation and access to a vault's cryptographic objects for respective resources connected to Azure Key Vault using VAP. Further, corresponding RBAC roles can be discovered as a function of the entity's respective VAP-based AKV. Client resources (e.g., computing applications, databases, or other resources) can be set forth in respective environments, referred to herein generally as landing zones ("lz"), which require respective RBAC roles associated with an entity's corresponding VAP access permissions. A landing zone can be considered a virtual environment that is logically separated from the network, such as a physical namespace. Landing zones can support various software as a service ("SAS") application, such as provided in SNOWFLAKE, SYMPHONY, or other suitable platform.

Operations performed by one or more computing devices in accordance with one or more example implementations can address technical challenges associated with application development ("app-dev") parties that can affect RBAC role assignments and changes. Software developers, programmers, systems engineers, system analysts, programmer analysts, database administrators, support teams, and other information technology specialists can be alleviated from creating and updating RBAC roles for applications. Other technical challenges addressed by the present disclosure include Azure Key Vault access switching from VAP authentication model to RBAC authentication model after a respective RBAC role has been added. Such challenges include a need for user-based administrative privileges for the RBAC role and changing models which, for security purposes, may not be available.

Other technical challenges addressed by the present disclosure include a risk of outage in upstream or downstream production environments, which require respective cryptographic objects for operation. The present disclosure eliminates complexities that can arise, for example, in large-scale organizations requiring thousands of Azure Key Vaults, each having multiple entities requiring migration from VAP to RBAC. Moreover, the present disclosure addresses a lack of segregation of duties, for example, where app dev personnel is provided administrative privileges to Azure Key Vault. Segregation of duties would otherwise be required to offset risk of an entity misusing privilege and causing technological, reputational, and costly damage to an organization. Moreover, the present disclosure includes one or more computing devices configured to evaluate current VAP permissions and identify a corresponding matching Azure Key Vault RBAC role(s) for each respective entity.

In one or more implementations of the present disclosure, an Azure Key Vault is accessed through an organization's defined roles with a centrally managed RBAC model applied on an Azure Key Vault. By eliminating a need for individuals to have access to the Azure Key Vault assigning RBAC roles, including to migrate from to RBAC mode A seamless and transparent migration of Azure Key Vault from VAP to RBAC mode is provided in accordance with the features shown and described herein.

In operation, one or more computing devices can be configured to operate to discover and generate a list of non-compliant/compliant Azure Key Vaults, which are operating in VAP permission mode. One or more computing devices execute instructions for comparison logic to evaluate current Azure Key Vault VAP permissions and to generate corresponding RBAC roles for the respective entity. Thereafter, the generated RBAC roles can be assigned to the Azure Key Vault entity through an Azure Key Vault Access Audit ("AAA") framework. In such instance, a service principal name ("SPN") having privileges, including owner or user account authentication ("UAA") entitlements at tenant level. One or more computing devices operate to verify the assigned RBAC roles, and segregate the role assignment for a respective user/group and service principal type. Thereafter, the Azure Key Vault is switched to RBAC mode, provided the entity has the RBAC role assigned for that entity's respective VAP. In operation, the steps can iterate in sequences of operation for each respective Azure Key Vault in VAP mode across the tenant.

Referring now to the drawings, FIG. 1 illustrates an example implementation of the present disclosure, including computing devices, processes, resources, and interaction therebetween, in connection with Azure Key Vault migration from VAP to RBAC. A plurality of user computing devices 104 are shown operating in a cloud computing environment, such as Azure, containing AKVs. Data discovery graph queries can be executed on each AKV, such as via SNOW-FLAKE, for access to key vault data associated with an organization's Azure resources. The data can include raw Azure Key Vault data, including VAP information associated with respective Key Vaults. Data discovery can be performed periodically to ensure data are current.

Continuing with reference to FIG. 1, one or more computing devices orchestrate a release pipeline, for example by user computing devices 104 attempting to access a respective AKV in VAP mode. The release pipeline can be initialized, and one or more databases can be accessed (e.g., Github ("GH") 105) and corresponding respective actions (e.g., GITHUB actions 106) can run using the respective credentials provided by a respective computing device 104. For example, one or more computing devices can run each of the respective actions 105 as the owner/UAA RBAC role, as a function of the AKV access audit framework 108. The release pipeline will be available for cloud lzs/resource groups to deploy/modify resources. The same release pipeline can provide access for a list of all AKVs along with existing VAPs and existing RBAC, roles if any.

In one or more implementations, the AKV access audit framework 108 can include at least one computing device 102 performing discovery processes (110), including by collecting role assignment data 112, which can include the keys, secrets, and certificates associated with a respective service principal 114 (e.g., a user assigned a respective role) and a role evaluator 116 for assessing the respectively assigned role, the scope at which the role is assigned, the name of the role assignment, and a description explaining why the role has been assigned. Such information can be accessed from a data lake 118. In this way, role definition data (or a "role") representing permissions and respective actions, such as read, write, and delete that are or are not allowed can be collected. Further, current vault access policy can be discovered. Other AKV VAP data can represent access policies determine the permissions user accounts, groups or applications have to respective key vaults items, cryptographic object permission (including for access to keys, secrets and certificates), and subscription data, such as a logical container used to provision various business or technical resources in Azure.

Respective data processing operations can include periodic (e.g., daily) extraction processes of raw Azure Key Vault data. One or more computing devices can be configured to evaluate recommended roles associated with existing VAPs for role mapping. Other data can represent existing AKV RBAC roles for Subjects accessing key vaults (if any). Further, reporting 120 can be provided, including visual representation(s) and custom filtering, such as for data sanitation processes by one or more computing devices to filter certain kinds of information, such as dev, qa, and production data. A filter option can be given in connection with a UI report, for example, based on environment, resource group, or other suitable criteria. Moreover, recommended AKV roles and existing AKV roles can be compared and evaluated to assess whether any missing roles exist. Information can also be evaluated for handling over provisioning (or under provisioning), as well as redundant AKV roles, and to narrow roles recommend for a respective AKV to only those that are required. For example, user computing device 104 (system identifier SPN) has access policies to read/write/delete crypto objects in key vault. Following data extraction and data processing operations, a key vault cryptographic role can be identified and recommended for managing all respective tasks. In the event any missing roles are identified, a determination can be made of risk in migrating from VAP to RBAC. Still further, a respective key vault owner can be identified to assign constraint RBAC Admin role, thereby enabling such owner to assign required AKV RBAC roles to other SPNs.

Figure 2:
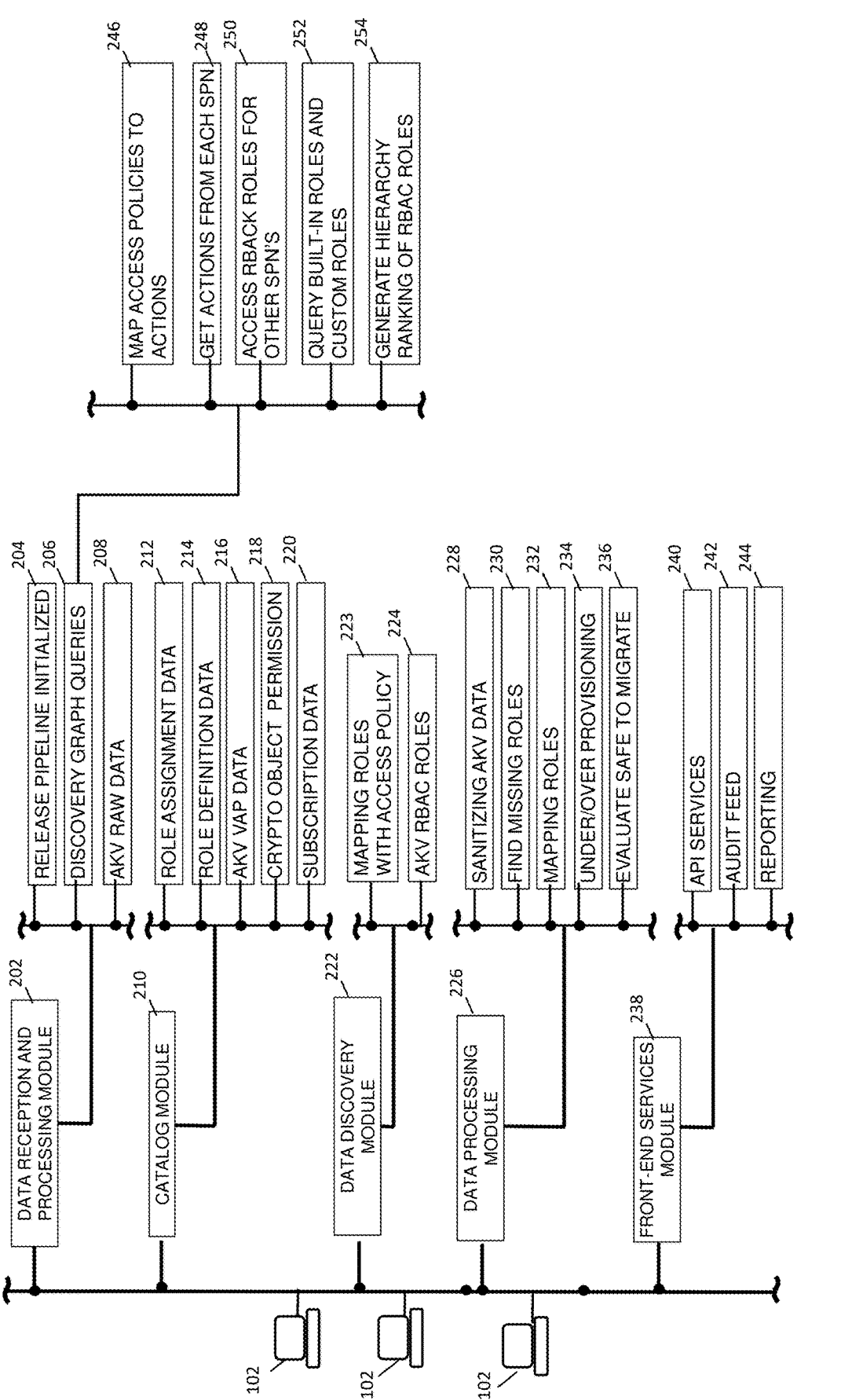
FIG. 2 is a diagram illustrating computing modules and associated data, data sources, operations, and processes associated therewith, in accordance with an example implementation of the present disclosure.

FIG. 2 is a diagram illustrating a plurality of computing modules and associated data and data sources, operations, and processes associated therewith, in accordance with an example implementation of the present disclosure. In the example shown in FIG. 2, data reception and processing module 202 can include one or more computing devices initializing a release pipeline 204, executing discovery graph queries 206 and accessing AKV raw data 208. Operations included with regard to discovery graph query operations 208 can include, for example, mapping access policies to specific actions 246, accessing actions from each of a plurality of SPNs 248, accessing RBAC roles for respective (e.g., other) SPNs 250 querying built-in roles and custom roles associated with respective SPNs 252 and generating a hierarchy ranking of RBAC roles 254.

Continuing with reference to FIG. 2, catalog module 210 can include access to role assignment data 212, role definition data 214, AKV VAP data 216, cryptographic object permission data 218, and subscription data 220. Furthermore, data discovery module 222 can include mapping roles with respect to a given vault access policy 223, as well as AKV RBAC roles 224. Further, data processing module 226 can include processes for sanitizing AKV data 228, finding missing roles 230, mapping roles 232, under/over provisioning 234, and evaluating whether conditions are safe for migrating from VAP to RBAC 236. Still further, front-end services module 238 can include, for example, application programming interface ("API") services 240, audit feed services 242, and reporting services 244.

Figure 3:
FIG. 3 is a diagram illustrating a low-level design for secure migration of authentication and access control, in accordance with an example implementation of the present disclosure.

FIG. 3 is a diagram illustrating a low-level design for secure migration of authentication and access control, from VAP to RBAC, associated with an AKV framework 300, in accordance with an example implementation of the present disclosure. As shown in FIG. 3, one or more computing devices can be configured by executing programming instructions for data discovery 110 (e.g., via SNOWFLAKE) with regard to AZURE Cloud 301, which contains AKVs. For example, data discovery graph queries can be executed by one or more computing devices to extract AKV data for AZURE resources, for example, associated with a given tenant for a respective organization. The data can include raw AKV data, including Key Vault information along with VAP information. Data discovery can occur periodically, such as daily, to ensure refreshed data.

Continuing with reference to FIG. 3, catalog 302 can include storing or access to role assignment data 304 can be collected, which can include various data types. For example, role assignment data 304 can include information representing a SPN (e.g., a user/groups/Service principal who is assigned the role), a respectively assigned role and the scope at which the role is assigned. Further, role assignment data 304 can include a name of a role assignment and a description explaining why a respective role has been assigned. In addition, role definition data 306 can be collected, which can include a collection of permissions in role definition lists of actions that can be performed, such as read, write, delete, or other action. Role definition properties can include, for example, Name, identifier, IsCustom, Description, Actions, NotActions, DataActions, NotDataActions, AssignableScopes, Condition, and ConditionVersion.

Continuing with reference to FIG. 3, AKV VAP Data 308 can be collected, which can include access policies, including respective permissions that user accounts, groups or applications have, in connection with key vault items. Moreover, cryptographic object permission 310 includes collected information that can include permissions to keys, secrets and certificates, or one or more sets thereof, associated with an object. Also shown in FIG. 3 are subscription data 312, such as an AZURE subscription, e.g., a logical container usable to provision related business or technical resources that may be available in the cloud, such as in AZURE.

One or more computing devices can be configured by executing instructions to process and manage data 314, such as raw data shown and described herein. Below are examples of processing steps and processed information in connection with an example implementation of the present disclosure. Processed information can represent mapping of roles 316 in accordance with an existing VAP. In such case, the existing VAP can be evaluated, and one or more computing devices can operate to recommend respective roles, based on the evaluation. Moreover, one or more computing devices can be configured by executing instructions to evaluate existing AKV RBAC roles for AKV access by respective objects to key vaults. Computing device operations can be performed to sanitize AKV data 320. A filtering option can be provided in UI reports. An ETL job can run by a scheduler, for example, on a daily basis to extract data. Moreover, one or more computing devices can provide, access, process, and/or manage role information representing AKV Roles with respect to one or more respective AKV access policies. Accordingly, roles can be mapped with AKV access policies 316.

Continuing with reference to FIG. 3, find missing roles 322 module can include one or more computing devices configured by executing instructions for comparing evaluated AKV roles that can be, for example, recommended by the provider (e.g., AZURE), as well as existing AKV roles. The comparison can be usable for missing role assessment and analysis. Moreover, handling over/under provisioning and redundancy of AKV roles 326 and recommending only required roles. For example, a respective SPN can have access policies to release key vault and read/write/delete key vault. One or modules of the present disclosure can include logic to identify and recommend a respective key vault cryptographic role for managing existing tasks. Based on missing roles, one or more computing devices can identify whether it is safe to migrate from VAP to RBAC 328. One or more computing devices can be configured to perform other operations, including locating a key vault owner associated for a particular key vault. Locating the key vault owner is usable to assign a Constraint Key Vault Admin role to the respective key vault owner and, as an app owner, required RBAC roles can be assigned to other SPNs (system IDS). Further, and as illustrated in FIG. 3, front-end services 330 can be provided, including power business intelligence reporting 332, provide REST API services 334, and for providing an audit feed 336 for a hygiene team. As used herein, a hygiene team can include a risk mitigation and governance team that directly interfaces with business team(s) to remediate environments in advance of respective risk due dates.

Figure 4:
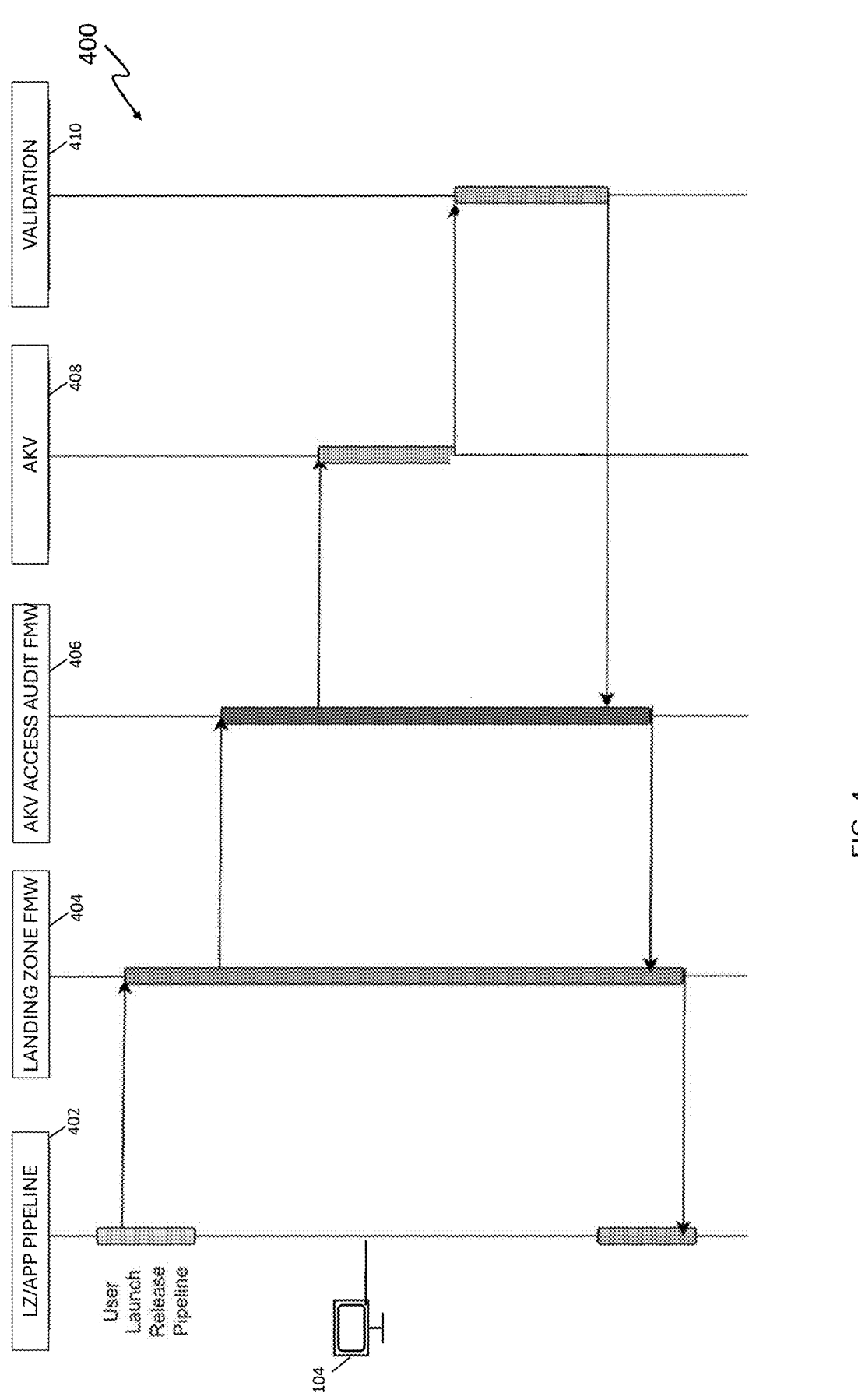
FIG. 4 is a high-level component and sequence diagram, including steps associated with an example implementation of the present disclosure.

FIG. 4 is a high-level component and sequence diagram, including steps associated with an example implementation of the present disclosure. A user computing device 104 can be configured to operate one or more respective applications, including to launch a release pipeline to a respective landing zone (402). In response, one or more computing devices can access and apply a landing zone framework (404), including or with an AKV access audit framework (406) and AKV migration framework (408). Application of an AKV migration framework can include executing a series of steps, including as shown and described herein. For example, one or more computing devices applying an AKV migration framework can be configured to discover roles, as a function of accessed raw AKV data. Further, one or more computing devices can conduct filtering and segregating processes on roles. Roles can be evaluated, including by one or more computing devices comparing roles associated with AKV VAP permissions and RBAC permissions. Thereafter, the one or more computing devices can assign role(s) and migrate from AKV VAP to AKV RBAC. Other AKV migration framework steps can include determining and providing roles that may be missing from VAP, as well as testing and performing validation (410) in advance of migration, to ensure accuracy, no interruptions, and seamlessness.

Figure 5:
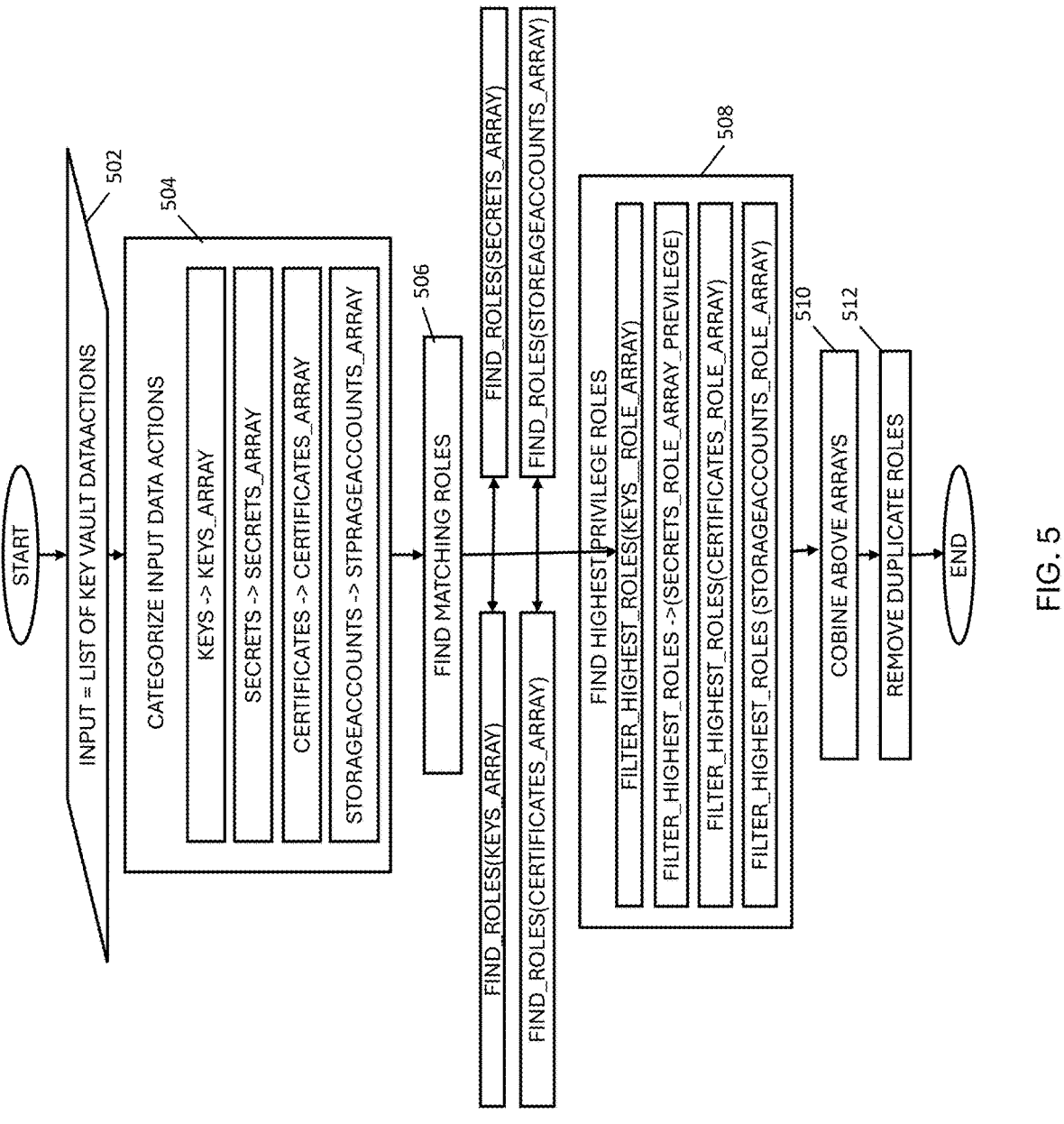
FIG. 5 is a diagram illustrating data processing flow of key vault data actions in connection with a secure migration of authentication and access control.

With reference to FIG. 5, in operation a list of key vault data actions can be input (502). Such inputted data actions can be categorized, such as by key(s), secret(s), certificate(s), and respective data storage accounts (504). Thereafter, matching roles can be located for secrets, keys, certificate and data storage data actions list. For each list created in step 504, respective RBAC Roles can be evaluated (506), including for ranking highest privilege roles including keys, secrets, certificates, and storage accounts (508). Moreover, role lists (e.g., cert role list, secret role list, certificate role list and storage account role list) uncovered during step 508 can be merged into one list (510), and all duplicates removed in 512 list, if any.

Figure 6:
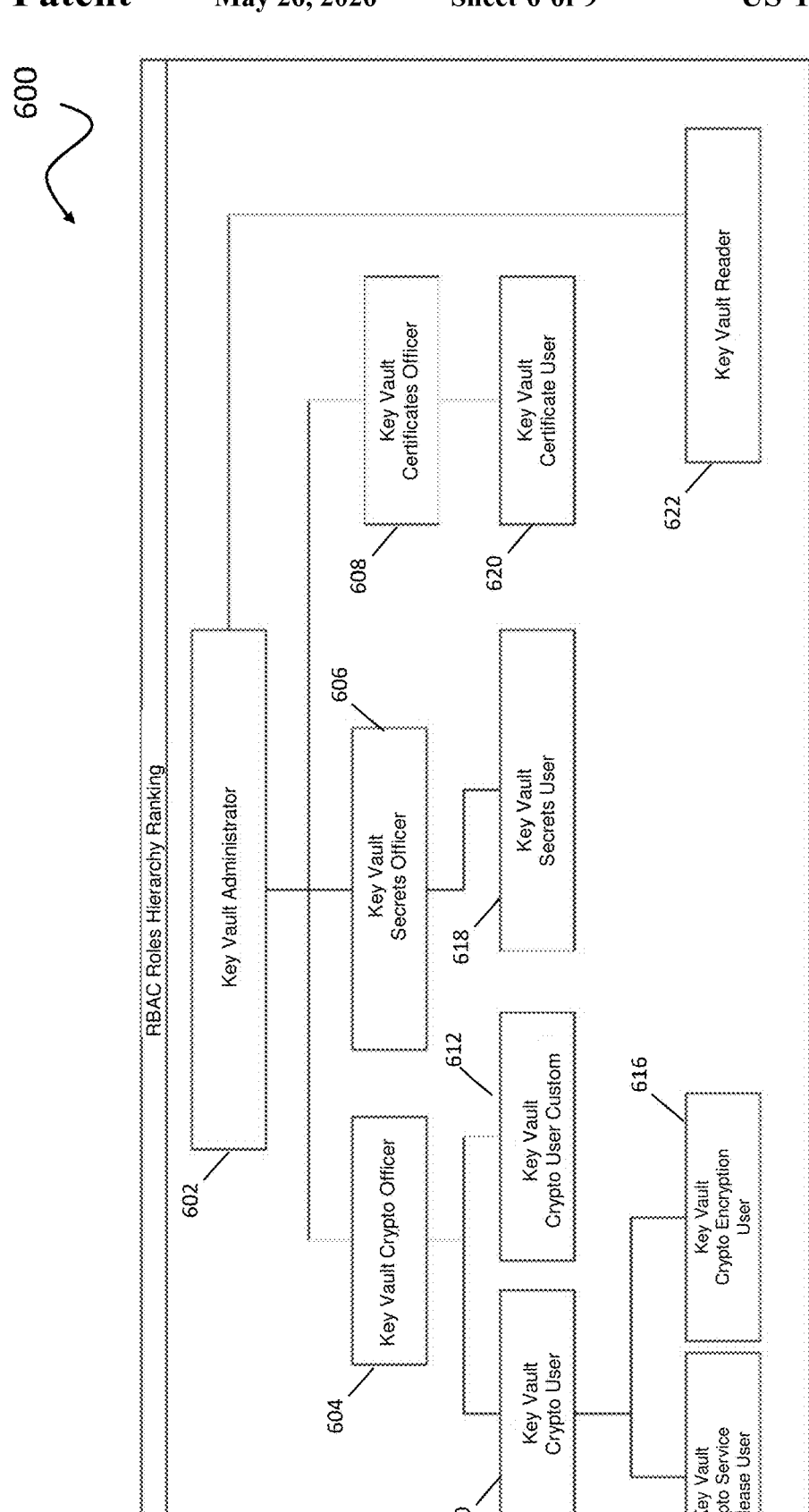
FIG. 6 illustrates an example roles hierarchy ranking in accordance with an example implementation of the present disclosure.

FIG. 6 illustrates an example RBAC roles hierarchy ranking 600 in accordance with an example implementation of the present disclosure. At the top of the hierarchy 600 is key vault administrator 602 Below key vault administrator 602 are key vault cryptographic officer 604 key vault secrets officer 606 and key vault certificates officer 608. Below key vault cryptographic officer 604 are key vault cryptographic user 610 and key vault cryptographic "custom" 612, which can be a variation on roles associated with the key vault cryptographic user 610. Below key vault cryptographic user 610 are key vault service release user 614 and key vault cryptographic encryption user 616. Below key vault secrets officer 606 is key vault secrets user 618. Below key vaults certificate officer 608 is key vault certificate user. Moreover, below key vault administrator 602 is key vault reader 622.

In one or more implementations of the present disclosure, one or more computing processes iterate over each role in a reference_roles dictionary. An input array can be defined associated with an entity's VAP permissions and used to check if all permissions in the input array (array) exist in a role's defined permissions associated with the reference_roles dictionary. Any roles that cover the input permissions can be, thereafter, appended, for example to a result list. Thereafter, the result list of roles can be filtered for those having the highest "privilege" value (i.e., the maximum number in a respective context). The filtering is usable to select a particularly appropriate role, in cases where multiple roles can satisfy a respective input condition.

Further, data actions can be determined that are associated with keys (including respective key rotation policies), secrets, certificates, and storage accounts. Arrays for each category can be used and, for each that is not empty, RBAC roles can be determined and stored. Such roles can include candidate roles for key-related actions, candidate roles for secret-related actions, candidate roles for certificates, and candidate roles for storage-related actions. For information associated with each respective role (e.g., stored in an array), one or more computing devices can filter roles for the "highest" (or most privileged) role(s) for each category. Various options can be included, such as in the event multiple highest roles exist and if any contain the word "secrets", other highest roles can be filtered out. Similarly, in the case of filtering for roles with the word "Crypto" for roles with the word "Certificate" can be a basis for filtering. Moreover, roles from all the categories can be concatenated into a single list and duplicate roles removed, for example by converting a list to a set, and then converting the set back to a list. Of course, one of ordinary skill can recognize various other data management techniques that are also suitable for determining and filtering data in accordance with the present disclosure, which are within the scope of the present disclosure. Roles can be recommended as a function of the foregoing, and data actions can be categorized by resource type (e.g., keys, secrets, certificates, and storage accounts).

Figure 7:
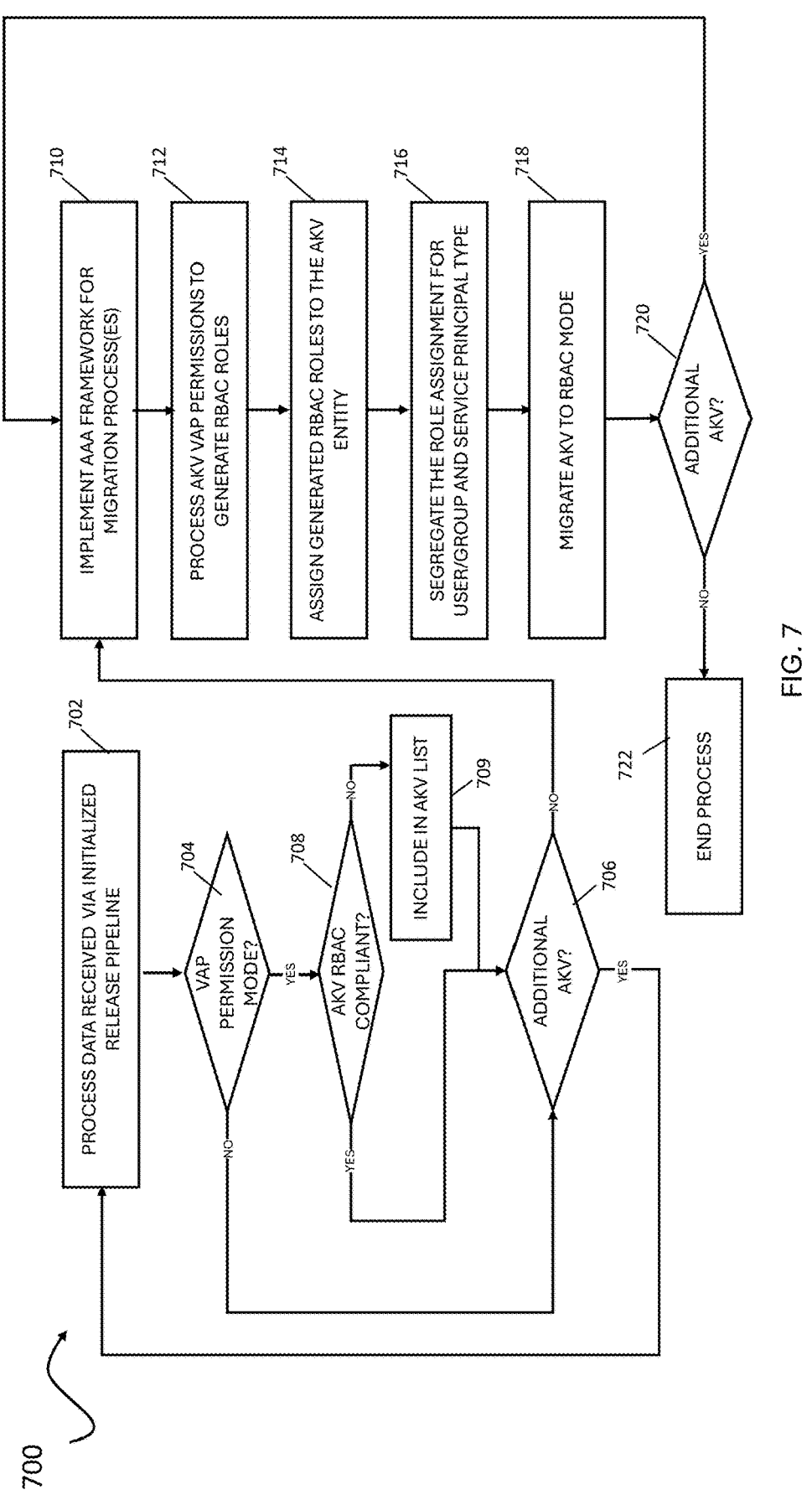
FIG. 7 shows a process flow illustrating example steps in a high-level process flow associated with an example implementation of the present disclosure.

The present disclosure provides for seamless and transparent migration of AKV from legacy VAP (Vault Access Policy) to RBAC mode and eliminate granting access to individuals for migrating the AKV to RBAC mode. FIG. 7 is a flow chart illustrating example steps in a high-level process flow associated with an example implementation of the present disclosure. It should be appreciated that several of the logical operations described herein can be implemented (1) as a sequence of computer-implemented acts or program modules running on a communication device and/ or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 7, one or more computing devices receives a data payload via an initialized release pipeline. In one or more implementations of the present disclosure, a release pipeline will be available for cloud lzs/resource groups to deploy/modify resources. The release pipeline can have access to listings of AKVs along with existing VAPs and Existing RBAC roles, if any. At step 702, the received data are processed and a determination of a respective vault access policy is made (704). If the outcome of the determination in step 704 is negative, then the process branches to step 706. At 706 a determination is made whether an additional AKV exists that may need migration from VAP to RBAC. If the outcome of the determination at 706 is affirmative and there are further AKV permission modes to process, then the process branches to step 702 and continues. Alternatively, if the outcome of the determination at step 704 is affirmative (the permission mode is VAP), a determination is made whether the VAP permission mode is compliant for the respective AKV (708). If the outcome of the determination in step 708 is negative (not compliant), then the AKV is included in an AKV list (or other data source) for future use in migration (709).

Continuing with reference to FIG. 7, if the outcome of the determination in step 706 is negative (no further AKV), then steps for migration are performed by one or more computing devices configured, for example, by executing instructions stored on processor-readable media. At 710, a framework (e.g., AAA framework) for a migration process from VAP to RBAC is implemented by one or more computing devices. A list or other data source of VAP non-compliant AKV (e.g., included in 709 and accessed following 706) can be processed in accordance with the framework, and a migration process initiated therewith. Respective AKV VAP permissions can be evaluated and used as reference for generating corresponding RBAC Roles for the respective entity (712). Moreover, generated RBAC roles can be assigned to the AKV entity, such as via a framework associated with the respective SPN, in accordance with owner or UAA entitlements at tenant level (714). Processing can further include segregation role assignment for user/group and service principal type (716), including to verify assigned RBAC roles. As noted herein, segregation of duties ensures an offset of risk of an entity misusing privilege and causing technological, reputational, and costly damage to an organization. Thereafter, at 718, provided the entity has the respective assigned RBAC role(s), one or more computing devices switch the AKV from VAP to RBAC.

Continuing with reference to FIG. 7, at 720 a determination is made whether an additional AKV exists for migration from VAP to RBAC. If the outcome of the determination at 720 is affirmative, then the process branches back to step 710. Alternatively, if the outcome of the determination is no additional AKV, then the process branches to step 722 and ends.

Figure 8:
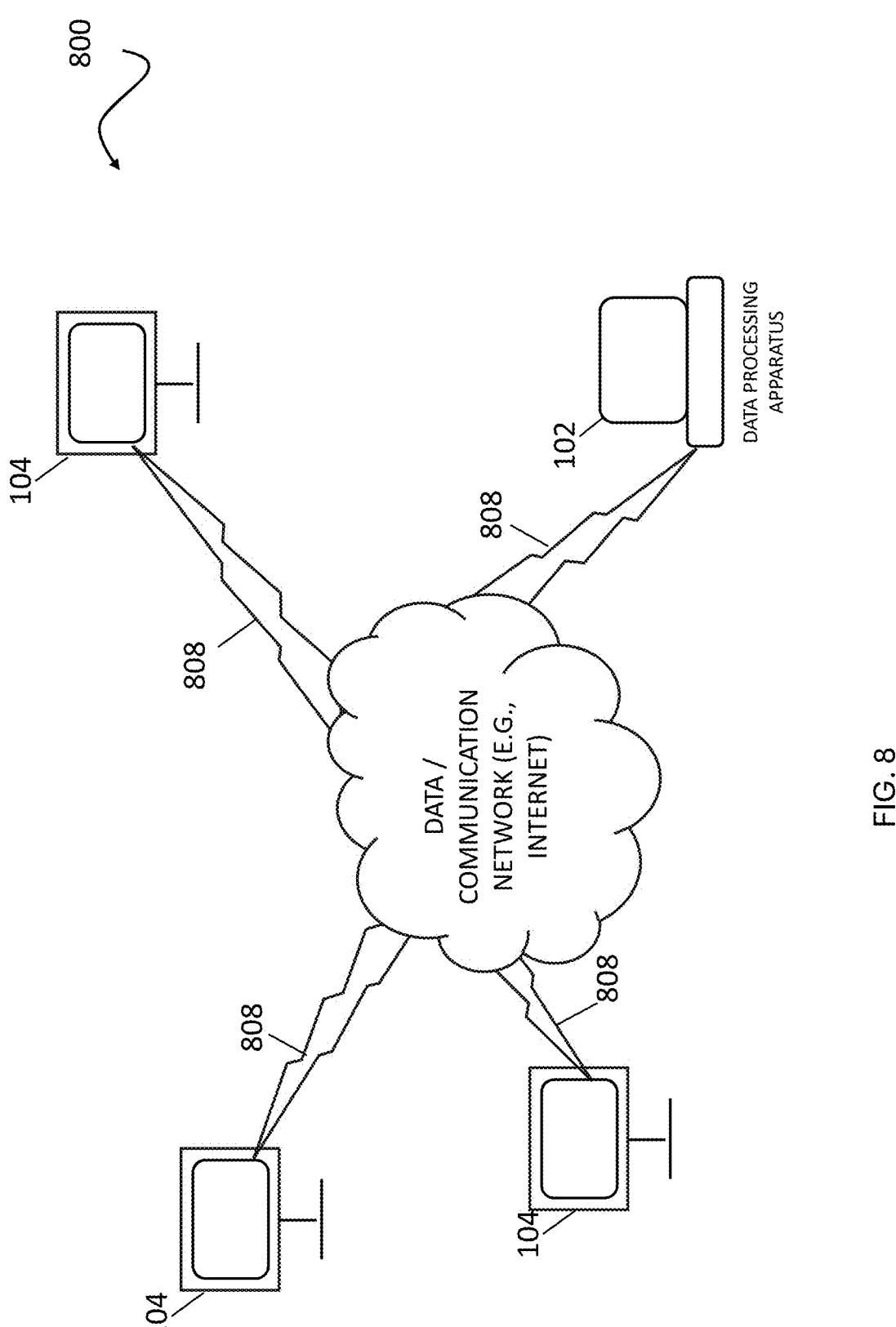
FIG. 8 is a diagram showing an example hardware arrangement that can be configured for providing the systems and methods disclosed herein.

Referring to FIG. 8, a diagram is provided that shows an example hardware arrangement 800 that is configured for providing the systems and methods disclosed herein and designated generally as system 800. System 800 can include one or more information processors 102 that are at least communicatively coupled to one or more user computing devices 104 across communication network 806. Information processors 102 and user computing devices 104 can include, for example, servers, workstations (e.g., desktop and notebook computers), mobile computing devices (e.g., tablets and smartphones), networking devices (e.g., hubs, repeaters, bridges, switches and routers), and various controller devices configured with electronics (e.g., integrated circuits and packages). Further, one computing device may be configured as an information processor 102 and a user computing device 104, depending upon operations being executed at a particular time.

With continued reference to FIG. 8, information processor 102 can be configured to access one or more databases for the present disclosure, including source code repositories and other information. However, it is contemplated that information processor 102 can access any required databases via communication network 806 or any other communication network to which information processor 102 has access. Information processor 102 can communicate with devices comprising databases using any known communication method, including a direct serial, parallel, universal serial bus ("USB") interface, or via a local or wide area network.

User computing devices 104 can communicate with information processors 102 using data connections 808, which are respectively coupled to communication network 806. Communication network 806 can be any data communication network. Data connections 808 can be any known arrangement for accessing communication network 806, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 have the ability to send and receive data and to provide received data and processed data across one or more networks. Arrangement 800 can include software that provides functionality described in greater detail herein, and preferably resides on one or more information processors 102 and/or user computing devices 104. One of the functions performed by information processor 102 is that of operating as a web server and/or a web site host. Information processors 102 typically communicate with communication network 806 across a permanent (i.e. un-switched) data connection 808. Permanent connectivity ensures that access to information processors 102 is always available.

Figure 9:
FIG. 9 shows an example information processor and/or user computing device that can be used to implement the techniques described herein.
Figure 9:
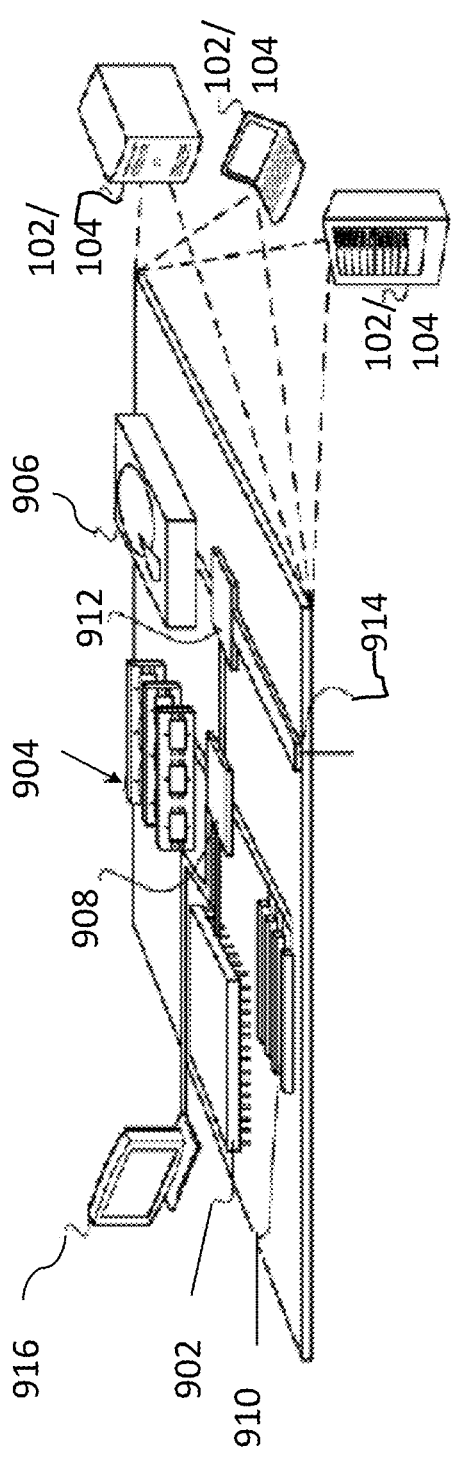

FIG. 9 shows an example information processor 102 and/or user computing device 104 that can be used to implement the techniques described herein. The information processor 102 and/or user computing device 104 is intended to represent various forms of digital computers, such as laptops, desktops, workstations, personal digital assistants, servers, blade servers, mainframes, and other appropriate computers. The components shown in FIG. 9, including connections and relationships, and their functions, are meant to be exemplary only, and are not meant to limit implementations of the inventions described and/or claimed in this document.

As shown in FIG. 9, the information processor 102 and/or user computing device 104 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution, for example stored on processor-readable media (including, but not limited to non-transitory processor readable media) accessible by the information processor 102 and/or user computing device 104, such as instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the information processor 102 and/or user computing device 104. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the information processor 102 and/or user computing device 104. In some implementations, the storage device 906 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 can be configured to manage bandwidth-intensive operations, while the low-speed interface 912 can be configured to manage lower bandwidth-intensive operations. Of course, one of ordinary skill in the art will recognize that such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In an implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Accordingly, the present disclosure includes one more computing devices configured for migrating an organization's Azure Key Vault access model from VAP to RBAC. A current status of AKV can be discovered, and VAP permission(s) evaluated. RBAC roles can be generated for a corresponding RBAC role. The corresponding missing RBAC role can be provided for each AKV entity, and added RBAC roles verified for each of the entities. Thereafter, the AKV can be flipped to RBAC model in accordance with the respective vault access policies model.

The present disclosure provides granularity when evaluating RBAC roles vs VAP for all AKVs. The present disclosure ensures end-to-end AKV migration auditing, and secure migration of the AKV access model. Regardless of the particular role(s) end-users may require for compliance for the corresponding VAP, the present disclosure ensures safe and accurate policy migration. No special permissions are required for migrate the AKV, beyond the otherwise required AKV access permissions of the entity. One or more frameworks can be integrated into an application's software development life cycle ("SDLC").

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It is noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for key vault access control security migration, the method comprising:

receiving, by at least one computing device from an entity operating a user computing device, key vault information representing at least a cloud computing-based information technology security infrastructure key vault that includes a cryptographic object for access to digital resources;

processing, by at least one computing device, at least some of the received key vault information to determine a first access control security model associated with the entity, wherein the first access control security model includes permissions to the cryptographic object for access to a respective a cloud computing-based technical resource;

performing, by at least one computing device, data discovery to determine at least cryptographic object permission and permission to the technical resource accessible as a function of the cryptographic object permission;

determining, by the at least one computing device, as a function of the data discovery, a role assignment that includes a security principal, at least one of a plurality of permissions, and the respective technical resource associated with a second access control security model, wherein the determined role assignments correspond with at least some of the received key vault information; and migrating, by the at least one computing device, access to the key vault for the entity from the first access control security model to the second access control security model, wherein access to the key vault is enabled as a function of the second access control security model.

2. The method of claim 1, wherein the role assignment further includes: role definition information; cryptographic object permission information; and subscription information; and further wherein the role assignment definition information is determined as a function of information associated with the first access control security model, including at least one of keys, secrets, certificates, and storage accounts.

3. The method of claim 2, wherein the role definition information represents: a principal who is assigned a respective role; the respective role assigned to the principal; and the technical resource.

4. The method of claim 2, wherein the cryptographic object permission includes access policies permission user accounts, groups, or applications to cryptographic objects in the key vault.

5. The method of claim 2, wherein the subscription information includes permission to keys, secrets, and certificates.

6. The method of claim 1, wherein determining the role assignment includes mapping, by at least one computing device, at least one role associated with the second access control security model with at least some of the received key vault information.

7. The method of claim 1, wherein the steps of processing at least some of the received key vault information, performing data discovery, determining the role assignment, and migrating access to the key vault are performed automatically, in accordance with at least one framework.

8. The method of claim 1, wherein the first access control security model is vault access policy (VAP) and the second access control security model is role based access control (RBAC).

9. The method of claim 1, further comprising:

providing, by at least one computing device, an audit associated with the entity's access to the key vault.

10. The method of claim 1, further comprising:

implementing, by at least one computing device, a segregation of duty function for users, user groups, and objects as a function of the key vault access control security migration.

11. A computer-implemented system for key vault access control security migration, the system comprising:

at least one computing device, comprising a processor and processor-readable media, wherein the processor is configured by executing instructions stored on the processor-readable media for:

receiving, from an entity operating a user computing device, key vault information representing at least a cloud computing-based information technology security infrastructure key vault that includes a cryptographic object for access to digital resources;

processing at least some of the received key vault information to determine a first access control security model, wherein the first access control security model associated with the entity includes permissions to the cryptographic object for access to a respective technical resource;

performing data discovery to determine at least cryptographic object permission and permission to the technical resource accessible as a function of the cryptographic object permission;

determining, as a function of the data discovery, a role assignment that includes a security principal, at least one of a plurality of permissions, and the respective technical resource associated with a second access control security model, wherein the determined role assignments correspond with at least some of the received key vault information; and migrating access to the key vault for the entity from the first access control security model to the second access control security model, wherein access to the key vault is enabled as a function of the second access control security model.

12. The system of claim 11, wherein the role assignment further includes: role definition information; cryptographic object permission information; and subscription information; and further wherein the role assignment definition information is determined as a function of information associated with the first access control security model, including at least one of keys, secrets, certificates, and storage accounts.

13. The system of claim 12, wherein the role definition information represents: a principal who is assigned a respective role; the respective role assigned to the principal; and the technical resource.

14. The system of claim 12, wherein the cryptographic object permission includes access policies permission user accounts, groups, or applications to cryptographic objects in the key vault.

15. The system of claim 12, wherein the subscription information includes permission to keys, secrets, and certificates.

16. The system of claim 11, wherein determining the role assignment includes mapping, by at least one computing device, at least one role associated with the second access control security model with at least some of the received key vault information.

17. The system of claim 11, wherein the steps of processing at least some of the received key vault information, performing data discovery, determining the role assignment, and migrating access to the key vault are performed automatically, in accordance with at least one framework.

18. The system of claim 11, wherein the first access control security model is vault access policy (VAP) and the second access control security model is role based access control (RBAC).

19. The system of claim 11, wherein the at least one computing device is further configured for:

providing an audit associated with the entity's access to the key vault.

20. The system of claim 11, wherein the at least one computing device is further configured for:

implementing a segregation of duty function for users, user groups, and objects as a function of the key vault access control security migration.

* * * * *